United States Patent
Blumenstock

(10) Patent No.: US 6,505,084 B2
(45) Date of Patent: Jan. 7, 2003

(54) PROGRAMMABLE CONTROLLER WHICH OPERATES BY MEANS OF DATA MANAGEMENT USING NETWORK COMPUTERS AND METHOD FOR OPERATING A PROGRAMMABLE CONTROLLER

(75) Inventor: Werner Blumenstock, Weisendorf (DE)

(73) Assignee: Siemens Aktiengesellschaft, Munich (DE)

( * ) Notice: Subject to any disclaimer, the term of this patent is extended or adjusted under 35 U.S.C. 154(b) by 16 days.

(21) Appl. No.: 09/826,350

(22) Filed: Apr. 5, 2001

(65) Prior Publication Data

US 2001/0037436 A1 Nov. 1, 2001

Related U.S. Application Data

(63) Continuation of application No. PCT/DE99/03030, filed on Sep. 22, 1999.

(30) Foreign Application Priority Data

Oct. 5, 1998 (DE) .......................................... 198 45 764

(51) Int. Cl.$^7$ ........................... G06F 11/14; G05B 11/01
(52) U.S. Cl. ............................. 700/21; 700/177; 714/5; 717/171; 709/221
(58) Field of Search ........................... 700/177, 82, 79, 700/19–21, 159, 83; 714/4, 5; 711/154; 707/10, 501.1; 717/171, 172; 709/220–222

(56) References Cited

U.S. PATENT DOCUMENTS

| | | | | |
|---|---|---|---|---|
| 4,141,066 A | * | 2/1979 | Keiles | 364/119 |
| 4,562,528 A | * | 12/1985 | Baba | 364/133 |
| 4,592,053 A | * | 5/1986 | Matsuura | 371/29 |
| 4,959,768 A | * | 9/1990 | Gerhart | 364/187 |
| 5,504,673 A | * | 4/1996 | Okamoto et al. | 364/187 |
| 5,712,969 A | * | 1/1998 | Zimmermann et al. | 395/182.03 |
| 5,872,919 A | * | 2/1999 | Wakeland | 395/200.6 |
| 5,878,257 A | * | 3/1999 | Nookala et al. | 395/652 |
| 5,925,140 A | * | 7/1999 | Hudson | 714/52 |

FOREIGN PATENT DOCUMENTS

| | | |
|---|---|---|
| DE | 44 08 544 A1 | 9/1995 |
| EP | 0 284 924 A2 | 10/1988 |

* cited by examiner

Primary Examiner—Paul P. Gordon
(74) Attorney, Agent, or Firm—Sughrue Mion, PLLC

(57) ABSTRACT

A memory-programmable controller used, in particular, in a larger automation system and a method for operation of a memory-programmable controller (S1–Sn). The memory programmable controller (S1–Sn) is linked to a central computer (R) of the automation system over a network (2). All of the user data (3), application programs (4), configuration data (5) and the operating systems (6) of the memory-programmable controller (S1–Sn) are stored on a central computer. However, only working copies of the data are stored in the memory of the memory-programmable controller (S1–Sn). In the case of a failure of the memory-programmable controller (S1–Sn) or components therein, the user data (3), application programs (4), configuration data (5) and/or the operating system (6) are loaded in the memory of the memory-programmable controller from a central computer (R) by way of the network (2). Because of this, updates to the operating system can be carried out centrally and very easily. In addition, in each case, the current versions of the application programs are available centrally and thus can be easily archived. Moreover, in the case of a malfunction, the required data can be loaded at any time, preferably automatically.

22 Claims, 1 Drawing Sheet

PROGRAMMABLE CONTROLLER WHICH OPERATES BY MEANS OF DATA MANAGEMENT USING NETWORK COMPUTERS AND METHOD FOR OPERATING A PROGRAMMABLE CONTROLLER

This is a Continuation of International Application PCT/DE99/03030, with an international filing date of Sep. 22, 1999, which was published under PCT Article 21(2) in German, and the disclosure of which is incorporated into this application by reference.

FIELD OF AND BACKGROUND OF THE INVENTION

The invention relates to a memory-programmable controller with a memory for storing user data, application programs, configuration data and/or an operating system.

In addition, the invention relates to a process for operation of a memory-programmable controller, whereby user data, application programs, configuration data and/or an operating system are stored in a memory of the memory-programmable controller.

Memory-programmable controllers are used in the area of automation technology. The memory-programmable controller generally has a memory in which all the data required for operation of the memory-programmable controller can be stored, e.g., the operating system, application programs as well as user data. Changes can be made to this data by the operator of the memory-programmable controller, which e.g., in the case of a malfunction, leads to a convoluted history regarding current versions of application programs, data, etc.

OBJECTS OF THE INVENTION

One object of invention is to achieve fast and safe start-up of a memory-programmable controller, especially in situations where a malfunction occurs.

SUMMARY OF THE INVENTION

This object, as well as others, are solved by use of a memory-programmable controller having a memory to store user data, application programs, configuration data and/or an operating system. The memory-programmable controller is provided for control of equipment in an automation system and is configured to operate within a network. The memory-programmable controller additionally has a control device for loading user data, application programs, configuration data and/or an operating system by way of the network from a central computer, which is especially useful if the memory-programmable controller fails and/or is replaced.

These objects are also solved by a process for operating a memory-programmable controller, whereby user data, application programs, configuration data and/or an operating system are stored in a memory of the memory-programmable controller as working copies of user data, application programs, configuration data and/or an operating system stored on a central computer. Especially in the case of a failure and/or a replacement of components of the memory-programmable controller, the user data, application programs, configuration data and/or the operating system are loaded from the central computer by way of the network.

The invention is based on the recognition that central data management is easier to archive and access than is a decentralized system having separate data present within each memory-programmable controller. For this reason, the memory-programmable controller (MPC) is designed as a so-called Net-MPC, i.e., the memory-programmable controller contains merely a control device that loads the current valid programs and data from a central computer of the automation system by way of a network connection. This means that only working copies of the current user data, application programs, configuration data and/or the operating system are stored in the memory of the memory-programmable controller. Thus, if this data is to be modified, the correction to the programs and data does not take place at the location of the memory-programmable controller itself, but rather only in the central computer. During a restart of the memory-programmable controller and/or e.g., when a module is replaced, etc., the current data is modified, i.e., updated data and programs are in turn loaded anew into the memory-programmable controller. Considerable advantages are achieved as a result, especially in larger automation systems. For instance, an update of the operating system can be carried out centrally, i.e., very simply. Complicated reconfiguration of the individual memory-programmable controllers is prevented. In addition, the current versions of the application programs and the data are available centrally and also can thus be easily archived and be used for error elimination when there are malfunctions. In addition, the memory-programmable controller according to the invention is able, e.g., after a hardware defect and a corresponding replacement of the defective module, to load the current programs and data automatically from the central computer. Complicated reprogramming of the memory-programmable controller is avoided.

A central and transparent management of the respective application programs and other data can be carried out. Specifically, the control device of the memory-programmable controller is preferably used to control the storage of changes to application programs and/or user data on the central computer of the network.

In the case of a malfunction, simple and safe replacement of the memory-programmable controller or of sub-components thereof, as well as a reliable restart are ensured, preferably, by configuring the control device of the memory-programmable controller to automatically load current programs and/or data following a malfunction of the memory-programmable controller.

BRIEF DESCRIPTION OF THE DRAWINGS

The invention and further advantageous refinements of the invention according to the features of the dependent claims are explained in more detail below with the aid of the diagrammatic, exemplary embodiments illustrated in the drawings.

DETAILED DESCRIPTION OF THE PREFERRED EMBODIMENTS

Figure 1:
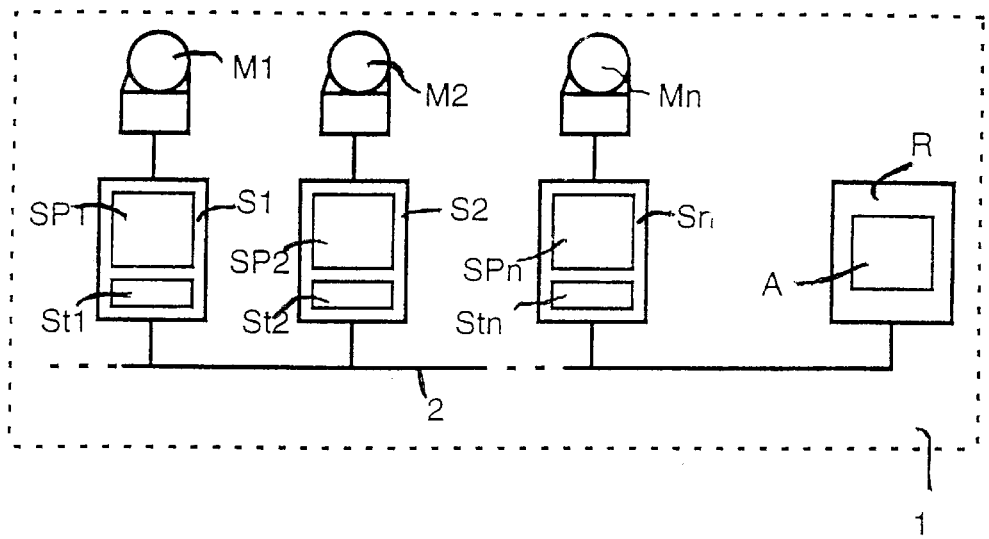
FIG. 1 is a block diagram of an embodiment of a network automation system with centralized data management for the memory-programmable controllers and FIG. 2 is a schematic representation of the data transfer process sequence between the central computer and the memory-programmable controller.

FIG. 1 shows a block diagram of an embodiment of a networked automation system 1. The automation system 1 has a central computer R with a central archive A. The central computer R is connected by way of a network connection 2 to a number of memory-programmable controllers S1–Sn. The memory-programmable controllers S1–Sn each contain a control device St1–Stn as well as a memory SP1–SPn. The memory-programmable controllers S1–Sn are connected to motors M1–Mn in the embodiment shown in FIG. 1.

The special characteristic of the automation system shown in FIG. 1 is that the memory programmable controllers S1–Sn are designed as so-called Net MPCs (network memory-programmable controllers). In other words, the memories SP1–SPn of the memory-programmable controllers S1–Sn store only working copies of the programs and data required for operation of memory-programmable controllers S1–Sn. The original data is stored centrally in an archive memory A of the central computer R of automation system 1.

The loading of the respective programs and data by way of the network connection 2 is carried out with the help of control devices St1–Stn of the memory-programmable controllers S1–Sn. The control devices St1–Stn are thus designed as so-called bootloaders, and are used to load programs and data by way of the network connection 2. When a memory-programmable controller S1–Sn is switched on, if necessary, the operating system of the memory-programmable controller, the configuration data, the application program and the user data are loaded, either automatically or, alternatively, at the initiative of the operator from the central computer R, which thus functions as a file server. Corrections in the application program and in the user data are always stored at the central location, i.e., in the central computer R. The memories SP1–SPn of the memory-programmable controllers S1–Sn contain merely a working copy of the programs and the data.

Because of the structure of the illustrated automation system 1, i.e., because the memory-programmable controllers S1–Sn are fashioned as so-called Net-MPCs, updates to the operating system can be carried out in a simple way. The current versions of application programs and data are available centrally in the archive memory A of the central computer R and can thus be easily archived. During a malfunction, or in the case of a hardware defect and component replacement in a memory-programmable controller S1–Sn, the current programs and data are preferably automatically loaded from the archive memory A of the central computer R. A complicated new start up and reconfiguration of the memory-programmable controller S1–Sn thus becomes superfluous.

Figure 2:
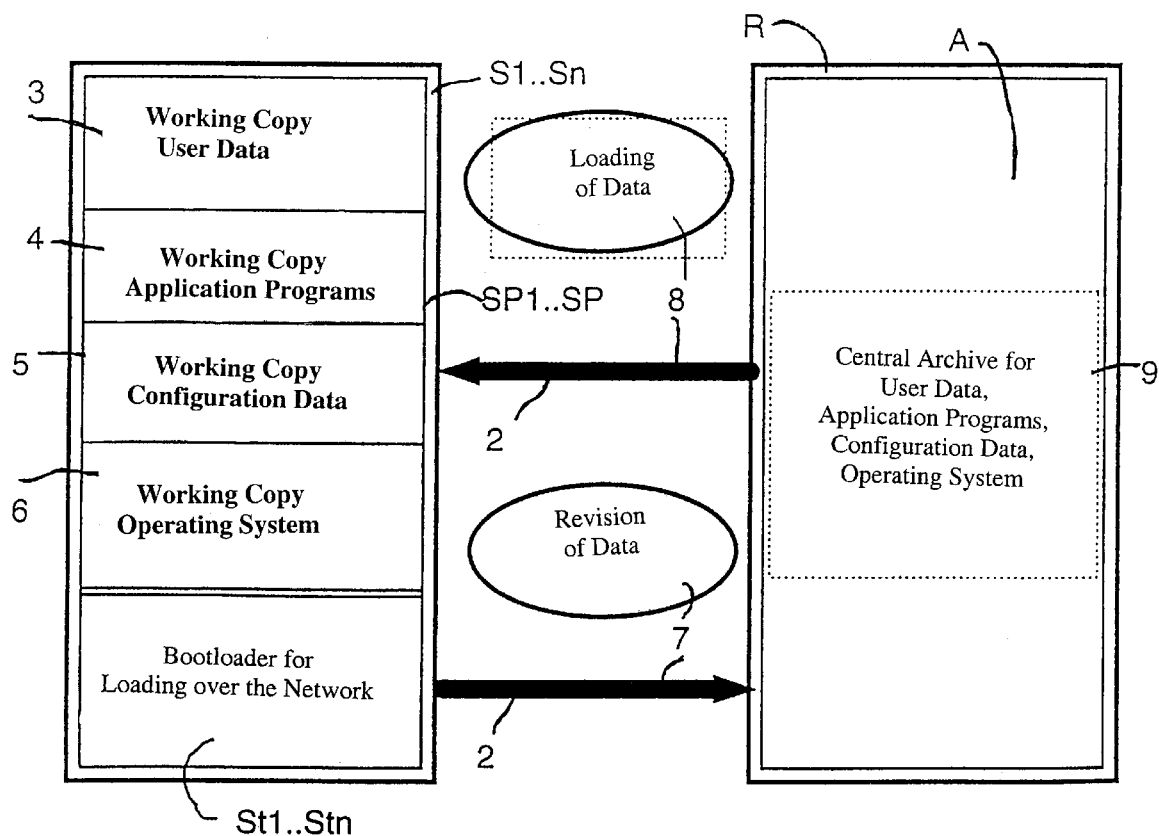

FIG. 2 shows a schematic representation of the process sequence of data transfer between a central computer R and a memory-programmable controller S1–Sn for a network connection 2. The central computer R contains in its archive memory A the central archive data 9 for user data, application programs, configuration data, and/or an operating system or systems. The memory-programmable controller S1–Sn has a memory device SP1–SPn and a control device St1–Stn. Working copies of the user data 3, the application programs 4, the configuration data 5 and the operating system(s) 6 are stored in memory SP1–SPn.

The data transfer by way of network connection 2 from the central computer R to the memory-programmable controller S1–Sn is carried out using process steps 7, 8. In the process step 8, the data stored in archive memory A is loaded, e.g., after a cold start or after a module is replaced in the memory-programmable controller S1–Sn. In another process step 7, programs and data corrections can be implemented by way of the network connection 2. Storage of these types of changes always takes place merely in the archive memory A of the central computer R and not in the memories SP1–SPn of the memory-programmable controllers S1–Sn. In the case of changes to programs and data, the loading as well as the storage of the changes are controlled by control devices St1–Stn of the memory-programmable controllers S1–Sn.

In summary, the invention thus relates to a memory-programmable controller, which in particular can be especially advantageously implemented in a larger-scale automation system, as well as to a method for operating a memory-programmable controller S1–Sn. The memory-programmable controllers S1–Sn are connected by way of a network 2 to a central computer R of the automation system. All the user data, application programs, configuration data and operating systems for memory-programmable controllers S1–Sn are stored in the central computer R. Only working copies 3, 4, 5, 6 of these data, etc. are stored in the memory-programmable controllers S1–Sn. In particular, in the event of a failure of components of the memory-programmable controller S1–Sn, new working copies of the user data 3, the application programs 4, the configuration data 5 and/or the operating system 6 are loaded from the central computer R by way of the network 2. In this way, updates of the operating system can be carried out very simply and centrally. In addition, the current versions of the application programs are available centrally and thus can be easily archived. Moreover, in the case of a malfunction, the necessary data can be loaded at any time, e.g. also automatically.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A memory-programmable controller, operable over a network connection and configured to control equipment in an automation system, comprising:
    a memory configured to store a plurality of data, said plurality of data comprising at least one of user data, at least one application program, configuration data and at least one operating system, and
    a control device configured to load said plurality of data in said memory from a central computer over the network connection.

2. The memory-programmable controller according to claim 1, wherein said control device is configured to load said plurality of data in said memory upon a failure and re-initiation of the memory-programmable controller.

3. The memory-programmable controller according to claim 1, wherein said control device is configured to load said plurality of data in said memory after at least a component of the memory-programmable controller is newly incorporated into the memory-programmable controller as a replacement part.

4. The memory-programmable controller according to claim 1, wherein said control device of the memory-programmable controller is configured to control the storage of changes to at least one of an application program and user data onto the central computer.

5. The memory-programmable controller according to claim 1, wherein said control device of the memory-programmable controller is configured to automatically load an updated version of said plurality of data after at least a defective module in the memory-programmable controller is replaced with a replacement module.

6. A process for operating a memory-programmable controller, comprising:

storing a first plurality of data in a memory of a central computer that is separate from a memory of said memory-programmable controller;

loading a second plurality of data in said memory of said memory-programmable controller as a working copy of the first plurality of data from the central computer via a network connection; and actuating a machine tool with said memory-programmable controller driven by said second plurality of data.

7. The process according to claim 6, wherein said loading of said second plurality of data in said memory is performed upon a failure and subsequent resumption in operation of the memory-programmable controller.

8. The process according to claim 6, wherein said loading of said second plurality of data in said memory is performed after at least one component of the memory-programmable controller is replaced with a replacement component.

9. The process according to claim 6, wherein said second plurality of data includes a working copy of at least one of user data, at least one application program, configuration data and at least one operating system.

10. The process according to claim 6, wherein said second plurality of data includes an archived copy of at least one of user data, at least one application program, configuration data and at least one operating system.

11. The process according to claim 6, further comprising:

storing changes in at least one of an application program and user data in said memory of said central computer but not in said memory of said memory-programmable controller.

12. The process according to claim 6, wherein said second plurality of data is loaded automatically from said central computer into the memory of said memory-programmable controller following replacement of a defective module in the memory-programmable controller.

13. A system for operation of a memory-programmable controller in the area of automation technology, comprising:

a memory-programmable controller;

a memory in said memory-programmable controller for storing a plurality of data;

a control device in said memory-programmable controller for loading said plurality of data in said memory of the memory-programmable controller;

a central computer separate from memory-programmable controller for archiving said plurality of data and accessible by said control device of the memory-programmable controller; and a network connection for connecting said central computer to said memory-programmable controller, wherein said control device loads said plurality of data in said memory using said archived data in said central computer upon failure of the memory-programmable controller replacement of at least a component of said memory-programmable controller.

14. The system according to claim 13, wherein said control device obtains said archived data from said central computer via said network connection.

15. The system according to claim 13, wherein said plurality of data comprises user data, at least one application program, configuration data and at least one operating system.

16. The system according to claim 13, wherein the control device of the memory-programmable controller controls the storage of changes to at least one application program and user data on said central computer.

17. The system according to claim 13, wherein the control device of the memory-programmable controller provides an automatic loading of an updated version of said plurality of data after a replacement of a defective module in the memory-programmable controller.

18. A memory-programmable controller, operable over a network connection and configured to control equipment in an automation system, comprising:

a memory configured to store a plurality of data, and a control device configured to load said plurality of data in said memory from a central computer over the network connection, wherein said control device is further configured to automatically load an updated version of said plurality of data after at least a defective module in the memory-programmable controller is replaced with a replacement module.

19. The memory-programmable controller according to claim 18, wherein said control device is further configured to load said plurality of data in said memory upon a failure and re-initiation of the memory-programmable controller.

20. The memory-programmable controller according to claim 18, wherein said control device is further configured to load said plurality of data in said memory after at least a component of the memory-programmable controller is newly incorporated into the memory-programmable controller as a replacement part.

21. The memory-programmable controller according to claim 18, wherein said plurality of data comprises at least one of user data, at least one application program, configuration data and at least one operating system.

22. The memory-programmable controller according to claim 18, wherein said control device is further configured to control the storage of changes to at least one of an application program and user data onto the central computer.

* * * * *